United States Patent [19]

Furuhashi et al.

[11] Patent Number: 5,784,070
[45] Date of Patent: Jul. 21, 1998

[54] METHOD AND APPARATUS FOR PRODUCING A POLYGONAL IMAGE REPRESENTATION THROUGH OPERATION OF PLOTTING COMMANDS ON IMAGE DATA

[75] Inventors: Makoto Furuhashi, Kanagawa; Masakazu Suzuoki, Tokyo; Akio Ohba, Kanagawa; Masaaki Oka, Kanagawa; Teiji Yutaka, Kanagawa; Masayoshi Tanaka, Kanagawa, all of Japan

[73] Assignee: Sony Corporation, Tokyo, Japan

[21] Appl. No.: 868,124

[22] Filed: Jun. 3, 1997

Related U.S. Application Data

[63] Continuation of Ser. No. 267,678, Jun. 29, 1994.

[30]     Foreign Application Priority Data

| Jul. 2, 1993 | [JP] | Japan | 5-190764 |
| Jul. 2, 1993 | [JP] | Japan | 5-190765 |
| Mar. 23, 1994 | [JP] | Japan | 6-076526 |

[51] Int. Cl.[6] ............................................. G06F 15/16
[52] U.S. Cl. ................... 345/419; 345/441; 345/473; 345/503; 345/522
[58] Field of Search ........................... 345/418–422, 345/425, 441–443, 473, 112–114, 501–506, 522

[56]             References Cited

U.S. PATENT DOCUMENTS

| 5,058,042 | 10/1991 | Hanna et al. | 345/427 |
| 5,287,436 | 2/1994 | Fischer et al. | 345/419 |
| 5,295,235 | 3/1994 | Newman | 345/433 |
| 5,388,841 | 2/1995 | San et al. | 345/473 |
| 5,394,516 | 2/1995 | Winser | 345/419 |

*Primary Examiner*—Matthew M. Kim
*Assistant Examiner*—U. Chauhan
*Attorney, Agent, or Firm*—Frommer Lawrence & Haug LLP; William S. Frommer

[57]             ABSTRACT

Methods and apparatus for generating image data are provided. A memory and a data processor are coupled with a system bus. In certain embodiments a data expanding apparatus is also coupled to the system bus and compressed data are transferred to the data expanding apparatus via the system bus and decompressed data are transferred therefrom to the memory without passing the compressed data through the data processor. Also in certain embodiments, an image data generation command string is transferred from the memory to an image data generation device via the system bus without passing the image data generation command string through the data processor.

11 Claims, 13 Drawing Sheets

FIG. 1A
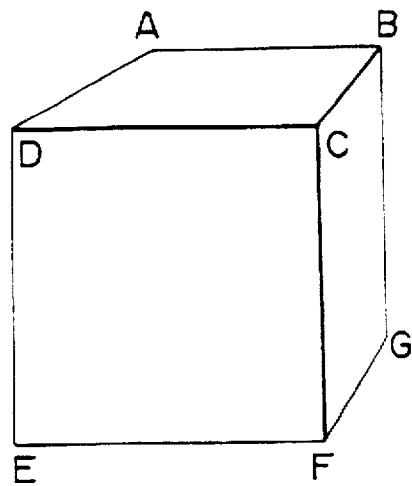
FIG. 1B
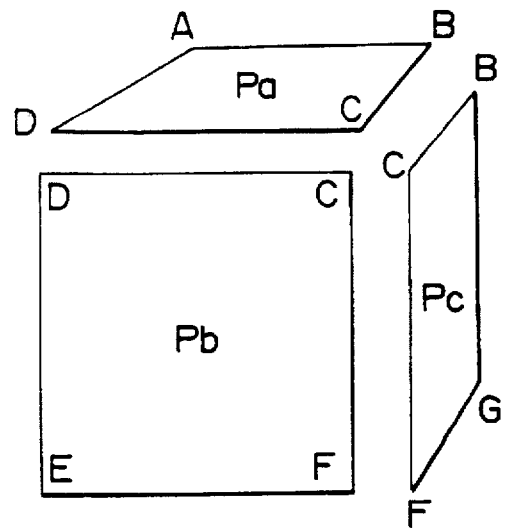
FIG. 2
IPa
| CODE | |
|---|---|
| Ax | Ay |
| Bx | By |
| Dx | Dy |
| Cx | Cy |
IPb
| CODE | |
|---|---|
| Dx | Dy |
| Cx | Cy |
| Ex | Ey |
| Fx | Fy |
IPc
| CODE | |
|---|---|
| Bx | By |
| Cx | Cy |
| Gx | Gy |
| Fx | Fy |

F I G. 6
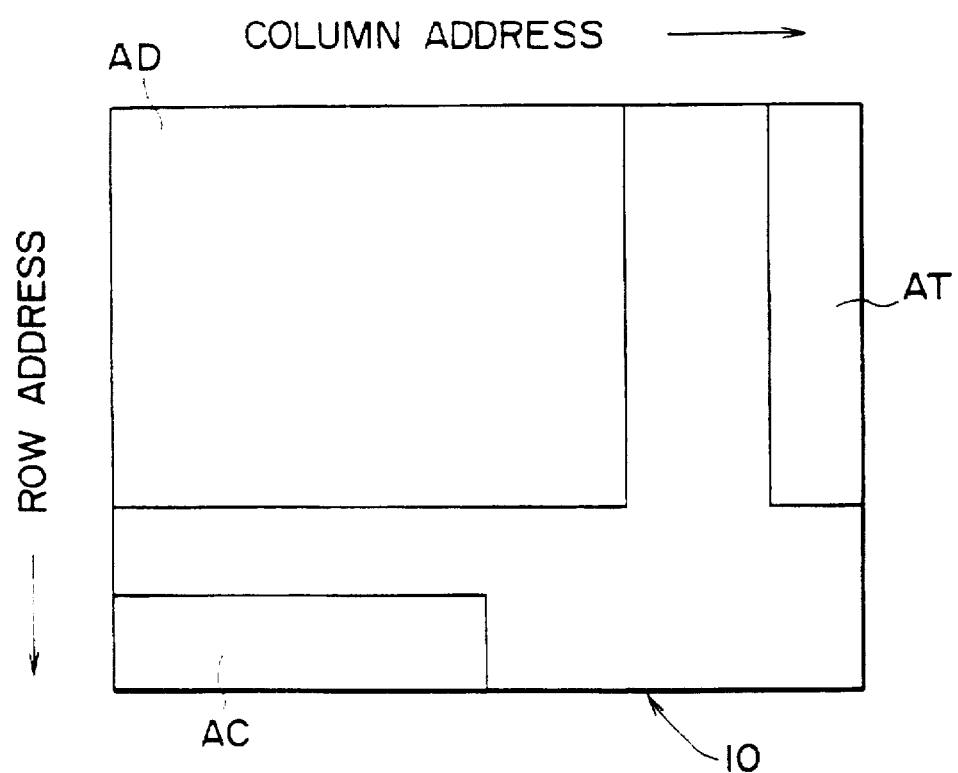

FIG. 7A
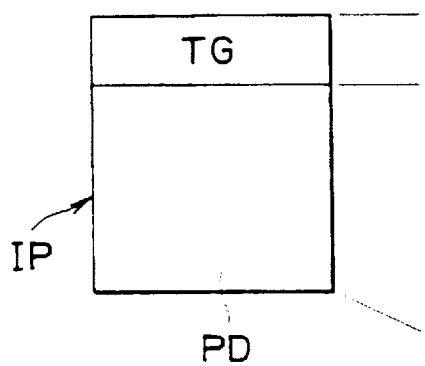
FIG. 7B
| TG | | | |
|---|---|---|---|
| IDP | R | G | B |
| Y0 | | X0 | |
| Y1 | | X1 | |
| Y2 | | X2 | |
| Y3 | | X3 | |
FIG. 8
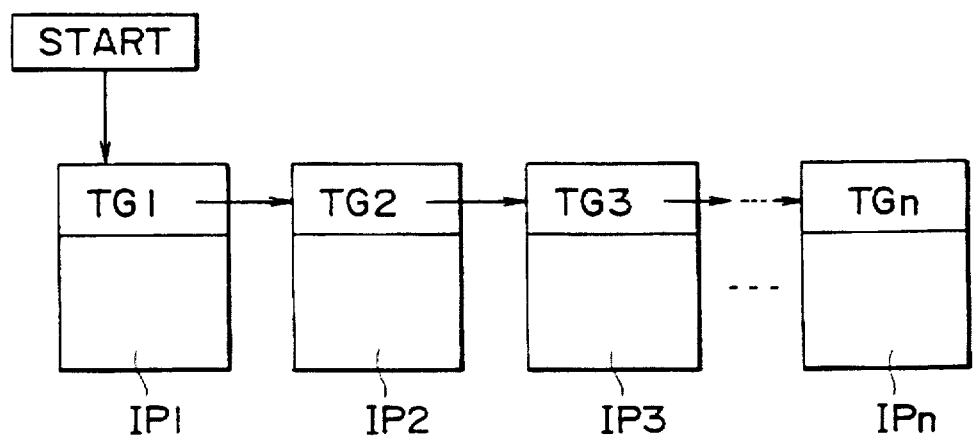

F I G. 10A
F I G. 10B
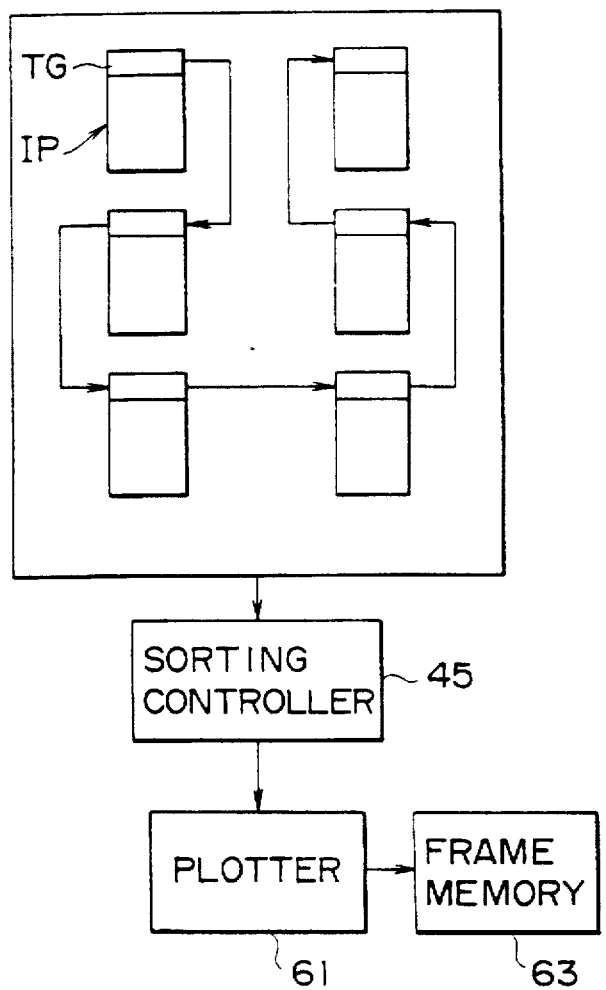
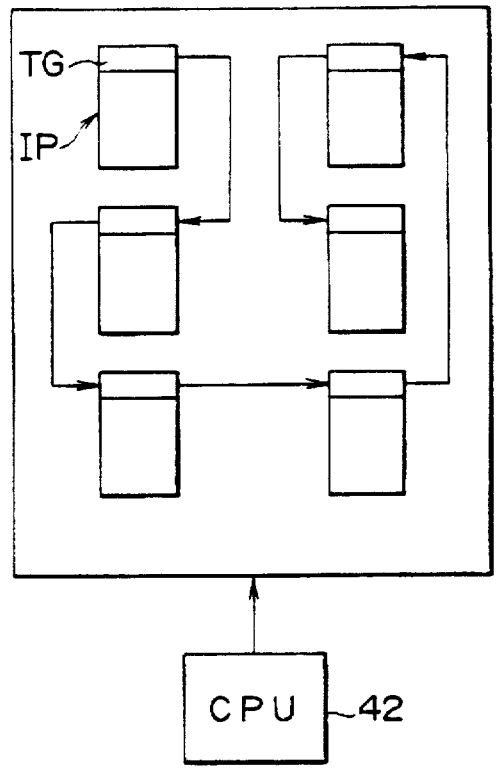

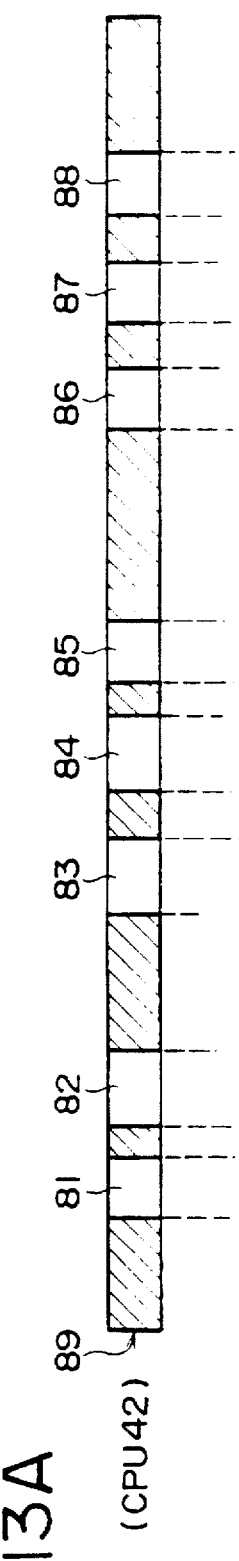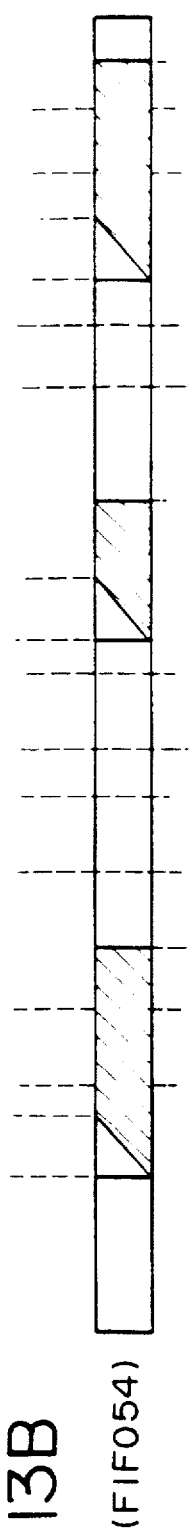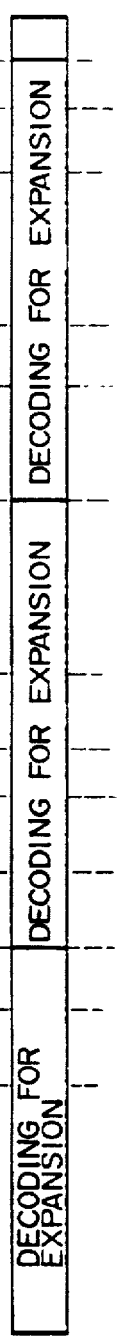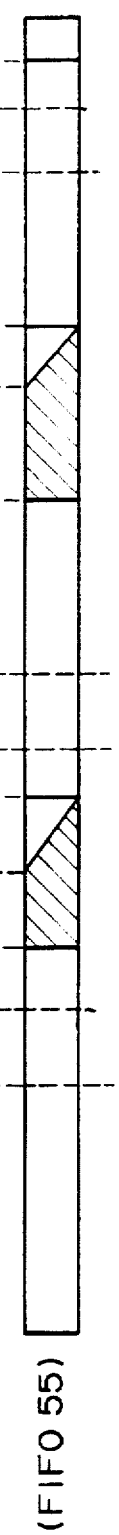
F I G. 13A (CPU42)
F I G. 13B (FIFO54)
F I G. 13C (FIFO 55)
F I G. 13D (FIFO 55)
F I G. 13E (FIFO 62)
F I G. 13F PLOTTER

METHOD AND APPARATUS FOR PRODUCING A POLYGONAL IMAGE REPRESENTATION THROUGH OPERATION OF PLOTTING COMMANDS ON IMAGE DATA

This application is a continuation of application Ser. No. 08/267,678, filed Jun. 29, 1994.

BACKGROUND OF THE INVENTION

The present invention relates to methods and apparatus for generating image data representing a picture which are capable of producing realistic images. The invention is particularly useful for video game apparatus and computer graphic applications, especially where hardware resources are limited.

In computer graphics applications, image data for representing objects realistically are plotted in a threedimensional or "3D" image space by separating the object into a number of polygonal surfaces, such as triangular or square surfaces, each of which is processed as a unit. Image data generated for each such polygonal surface are then stored successively in a frame memory, such as a video RAM, whose memory space corresponds to a display screen of a monitor or other device which is used to produce the image of the object from the image data stored in the frame memory.

In such applications, a dedicated plotting processor normally is provided between a central processing unit (CPU) and a frame memory in order to enhance processing speed. When the image data are generated, the CPU supplies a plotting command to the plotting processor for producing a polygonal image surface such as a triangle or square (such command being referred to hereinafter as a "plotting command"), so that the CPU need not produce the image data and supply the same directly to the frame memory. The plotter translates the command received from the CPU and subsequently plots the polygonal image surface in the frame memory.

FIGS. 1A and 1B illustrate a technique for plotting polygonal image surfaces. In order to produce image data representing a solid object having rectangular faces with illustrated vertices A through G as illustrated in FIG. 1A, each of the rectangular surface areas of the object is processed separately. That is, in the illustrated example as shown in FIG. 1B, separate plotting commands IPa, IPb and IPc are produced by the CPU for generating polygonal image areas Pa, Pb and Pc, respectively. The plotting commands IPa, IPb and IPc are illustrated schematically in FIG. 2, each of which includes respective vertex coordinates (Ax, Ay) through (Dx, Dy), (Cx, Cy) through (Fx, Fy), and (Bx, By) through (Gx, Gy), and a CODE providing information concerning color and other characteristics of the image data to be included in the polygonal surface areas Pa, Pb and Pc.

The plotting commands as generated by the CPU are transferred thereby to the plotter which produces image data for each of the polygonal surface areas in response to the plotting commands and stores the data in the frame memory. The image data is subsequently read from the frame memory, converted to an analog signal and displayed by a monitor to produce an image of the object as illustrated in FIG. 1A.

CD-I disks are a type of previously developed CD-ROM disk which permit the recording of audio data and various other kinds of data including image data, text data, computer programs, etc. The image data is recorded in compressed form on the CD-I disk.

It is difficult to represent moving pictures by means of a 3D graphic system. Consequently, digital moving picture reproduction systems are provided which receive compressed image data from a CD-ROM as a secondary memory in order to provide a background image or the like as a complement to a 3D system. However, such digital moving picture reproduction systems are somewhat inferior to 3D graphic systems in terms of interactivity.

FIG. 3 provides a block diagram of a conventional composite system including a 3D graphic system and a moving picture reproduction system. The system of FIG. 3 includes a main bus 10, as well as a number of devices coupled thereto including a CPU 11, a main memory 12, a CD-ROM decoder 13 and an image expander 14. The CD-ROM decoder 13 receives encoded data from a CD-I disk reproduced by a CD-ROM driver 15 and decodes the received data. The data provided by the CD-ROM decoder 13 from the disk include plotting commands for computer graphics and animation data, as well as still image data of natural pictures and moving picture image data compressed through discrete cosine transformation (DCT).

The decoded data supplied by the CD-ROM decoder 13 are first transferred to the main memory 12 for storage therein. The CPU subsequently transfers the plotting commands from the main memory 12 to a plotter 19 via a first-in first-out (FIFO) buffer 16, a coordinate calculator 17 and another FIFO buffer 18. The coordinate calculator 17 produces new vertex coordinates for the polygonal image surface area to be generated by a given plotting command. The plotting commands from the coordinate calculator are transferred to the plotter 19 via the FIFO 18 and the plotter 19 carries out the commands to plot the corresponding polygonal surface areas to produce image data to be stored in a frame memory 20.

The CPU 11 supplies the compressed image data from the main memory 12 to the image expander 14 which is coupled by an exclusive local bus to a local frame memory 21 which the expander 14 uses to expand the compressed image data and store the expanded image data. With reference also to FIG. 4, the image expander 14 receives the compressed image data at an input 31 from which the data are supplied to a Huffman decoder 32. After Huffman decoding, the data are supplied from the decoder 32 to a dequantizer 33 for requantization. The requantized data from the apparatus 33 are supplied to an inverse DCT circuit 34 which transforms the data to its original form prior to compression for storage on the CD-ROM. This data is output in an 8×8 matrix form and supplied at an output terminal 35 of the image expander 14.

The expanded image data are read out from the local frame memory 21 to a D/A converter 22 for conversion to analog form. The analog data from the converter 22 are supplied to a first input of a multiplexer 23 which receives the 3D image data from the frame memory 20 via a further D/A converter 24 at a second input of the multiplexer 23. The multiplexer 23 selects one of the analog signals received at its first and second inputs for output to an image monitor 25 in order to produce a composite image.

It will be appreciated that the conventional composite system of FIG. 3 is relatively complex as it requires separate circuitry for producing the 3D image data and the moving picture data. Moreover, once the 3D image data and the moving picture data have been produced, a multiplexer is required for mixing the data to produce a composite image.

OBJECTS AND SUMMARY OF THE INVENTION

It is an object of the present invention to provide methods and apparatus for producing image data which overcome the foregoing disadvantages and shortcomings of conventional techniques.

It is another object of the present invention to provide methods and apparatus for producing image data which make efficient use of hardware resources and which may be implemented by means of less complex and less expensive devices.

In accordance with an aspect of the present invention, a method of generating image data from compressed data stored in a memory is provided wherein the memory is coupled with a system bus to which a data processor and a data expanding apparatus are also coupled. The method comprises the steps of: transferring the compressed data to the data expanding apparatus via the system bus and without passing the compressed data through the data processor, decompressing the compressed data by means of the data expanding apparatus to produce decompressed data, transferring the decompressed data from the data expanding apparatus to the memory without passing the compressed data through the data processor, and generating the image data based on the decompressed data.

In accordance with a further aspect of the present invention, a method of generating image data by means of a system including a data processor, a memory storing an image data generation command string, an image data generation device and a system bus coupled with each of the data processor, the memory and the image data generation device, is provided. The method comprises the steps of: transferring the image data generation command string from the memory to the image data generation device via the system bus without passing the image data generation command string through the data processor, and generating image data by means of the image data generation device using the image data generation command string.

In accordance with a further aspect of the present invention, an image data generating apparatus comprises: a system bus, a data processing apparatus coupled to the system bus and operative to restrict access thereto during restricted access time intervals and to release the system bus to permit access thereto during release time intervals, a memory coupled to the system bus and having a first memory area for storing compressed image generation data, a data expander coupled with the system bus and operative to decompress the compressed image generation data to produce decompressed image generation data, a data transfer apparatus coupled to the system bus and operative to transfer the compressed image generation data from the memory to the image expander and to transfer decompressed image generation data from the image expander to the memory during at least some time intervals without passing the compressed image generation data or the decompressed image data through the data processing apparatus, the memory being operative to store the decompressed image generation data from the image expander in a second memory area, and an image generation apparatus coupled with the system bus to receive the decompressed image generation data from the memory and operative to produce image data therefrom.

In accordance with yet another aspect of the present invention, an image data generating apparatus comprises: a system bus, a data processing apparatus coupled to the system bus and operative to restrict access thereto during restricted access time intervals, the system bus being released to permit access thereto during release time intervals, a memory coupled to the system bus and having a first memory area for storing an image data generation command string, an image data generator coupled with the system bus and operative to produce image data using the image data generation command string, and a data transfer apparatus coupled to the system bus and operative to transfer the image data generation command string from the memory to the image data generator during at least some of the release time intervals without passing the image data generation command string through the data processing apparatus.

In accordance with a still further aspect of the present invention, a game playing apparatus comprises: a system bus, a data processing apparatus coupled to the system bus and operative to restrict access thereto during restricted access time intervals, the system bus being released to permit access thereto during release time intervals, a main memory coupled to the system bus and having a first memory area for storing an image data generation command string, a game user input device including means for coupling with the main bus and operative to receive game operation command data in response to game operation commands from a user and to supply the game operation commands to the main bus, an image data generator coupled with the system bus and operative to produce image data representing a game image using the image data generation command string, the data processing apparatus being operative to modify the image data generation command string in response to the game operation command data, the game playing apparatus further comprising: a data transfer apparatus coupled to the system bus and operative to transfer the image data generation command string from the main memory to the image data generator during at least some of the release time intervals without passing the image data generation command string through the data processing apparatus, frame memory means for storing the image data produced by the image data generator, and means for supplying the image data from the frame memory means to produce the game image by means of a display device.

In accordance with a still further aspect of the present invention, a circuit for use in an image generating apparatus comprises: a system bus, a data processor connected to the system bus and operative to restrict access thereto during restricted access time intervals, the system bus being released to permit access thereto during release time intervals, a memory connected to the system bus and having a first memory area for storing an image generation command string, an image data generator connected to the system bus and operative to produce image data using the image data generation command string, and a data transfer apparatus connected to the system bus and operative to transfer the image data generation command string from the memory to the image data generator during at least some of the release time intervals without passing the image data generation command string through the data processor.

By transferring the compressed data from memory to a data expander and returning decompressed data from the data expander to the memory for storage without passing the compressed or decompressed data through the data processing apparatus, the data processing apparatus is freed to perform other tasks so that faster processing capability is achieved. Moreover, by returning the decompressed data to a memory from which it may be accessed by the data processing unit, the invention enables the data processing unit to generate multiple composite image data using the decompressed data.

By transferring image data generation command strings from memory to an image data generation device via a system bus without passing the image data generation command string through a data processor, the invention permits the data processor to carry out still other tasks, such as updating of generation commands in response to a user command (for example, in a video game apparatus) to provide an interactive image generation capability. While the system bus is not utilized by the data processor as it carries out other processing tasks, the command strings may be transferred to the image data generation device, so that real time generation of realistic images can be achieved.

By coupling the data expander and the image generation apparatus with the system bus and transferring data between the memory and these devices via the system bus, it is possible to dispense with the need for a local memory to serve the data expander.

Since the data processor is freed from the task of transferring data and commands as described above, it is able to carry out tasks of generating a composite image as well as image plotting commands without impairment of real-time performance. In certain embodiments, the expanded image data is converted into a data format corresponding with that of the plotting commands, so that common processing and storage of the expanded image data and plotting commands is facilitated for producing image data for depicting a plotted image between images generated by means of the expanded image data.

By storing the plotting command strings in a memory accessible to a data processor, the data processor is enabled to exercise direct control of the plotting command strings to enhance the ability to update the image data in response to an external input, for example, from a game controller or the like. It is therefore possible to enhance the response speed of the system to achieve superior real-time game capabilities.

Since it is unnecessary to provide the data expander with a local memory, it is sufficient in certain embodiments to provide the data expander with relatively small FIFO buffers capable only of holding data on which the data expander is operating at a given time as well as to hold expanded data for transfer to memory. Since the data processor has been freed from certain time consuming tasks, it is capable of assisting in the process of expanding the image data, so that the hardware serving as the data expander can be reduced in scale.

Since the image generation apparatus operates on commands transferred from the memory, the apparatus need only buffer a single plotting command. Accordingly, the circuit scale of the data generating apparatus is likewise reduced.

In certain embodiments, each plotting command is provided with the address of the next plotting command in the memory. Accordingly, any modification requiring a change in the order in which the plotting commands are carried out only requires changing certain ones of the addresses in the plotting commands. Consequently, the plotting commands need not be rewritten or rearranged and stored at a new address location, and the load on the system bus is further reduced.

BRIEF DESCRIPTION OF THE DRAWINGS

FIGS. 1A and 1B are schematic diagrams for use in illustrating an exemplary image plotting method;

FIG. 2 illustrates exemplary plotting commands for the method of FIGS. 1A and 1B;

FIG. 6 is a schematic diagram for illustrating a memory space of a frame memory of the FIG. 5 embodiment;

FIGS. 7A and 7B illustrate exemplary polygon plotting commands used in the embodiment of FIG. 5;

FIG. 8 is a schematic diagram for use in explaining the order in which polygon plotting commands are carried out in the embodiment of FIG. 5;

Figs. 10A and 10B illustrate parallel operations of generating a polygon plotting command string and the simultaneous execution of a previously generated command string in the embodiment of FIG. 5;

FIGS. 13A through 13F illustrate utilization of a system bus over time in the embodiment of FIG. 5;

DETAILED DESCRIPTION OF CERTAIN ADVANTAGEOUS EMBODIMENTS

Figure 5:
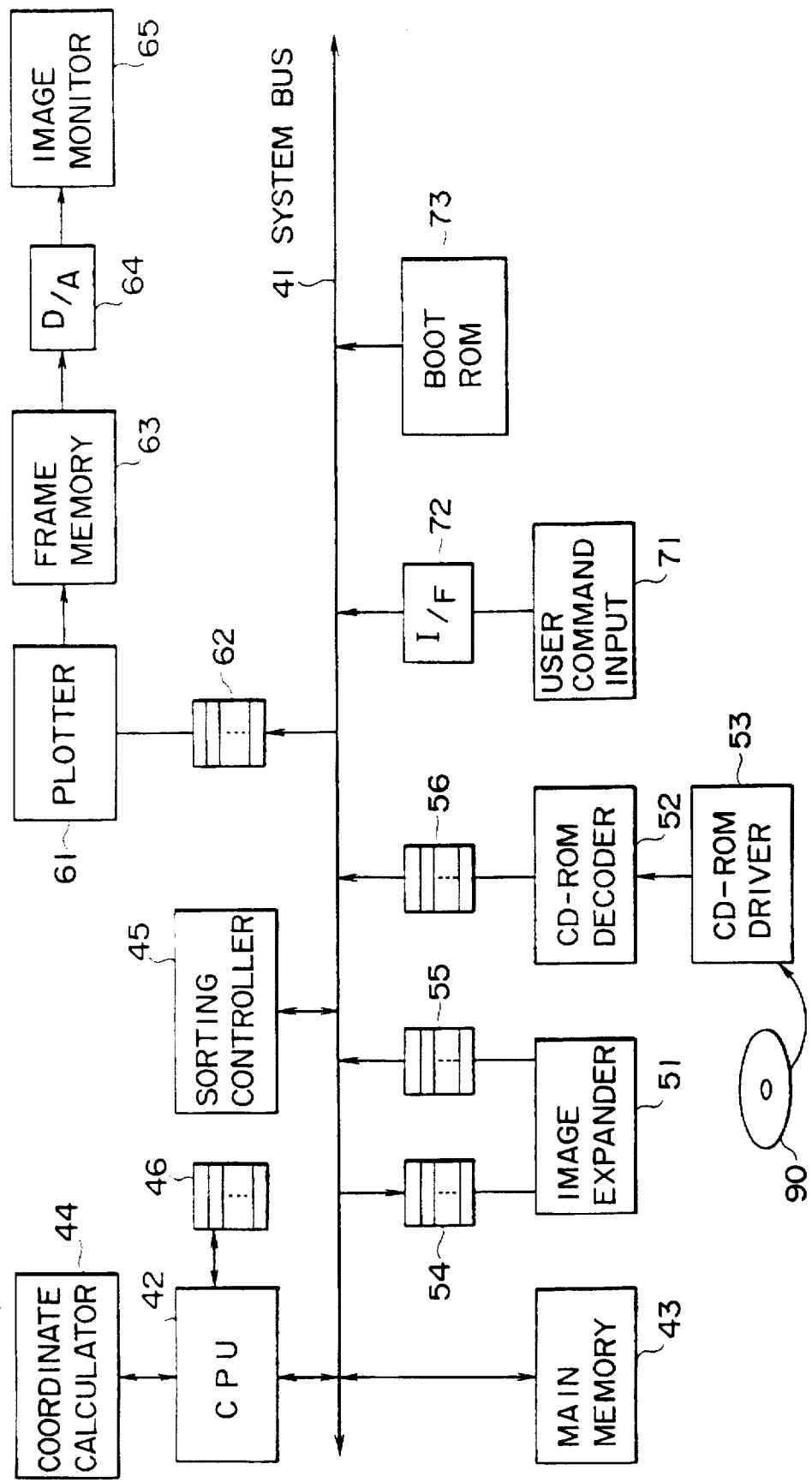
FIG. 5 is a block diagram of an embodiment of a game playing apparatus according to the present invention.

With reference now to FIG. 5, an embodiment of an image generating apparatus in accordance with one embodiment of the present invention is illustrated in block format therein. The embodiment of FIG. 5 is adapted for use as a game playing machine and carries out both a 3D graphic function and a moving picture reproduction function.

The apparatus of FIG. 5 includes a system or main bus 41 to which a central processing unit (CPU) 42, a main memory 43 and a sorting controller 45 are connected. An image expander 51 is also connected to the system bus 41 via an input FIFO buffer memory 54 and an output FIFO buffer memory 55. In addition, a CD-ROM decoder 52 is coupled to the system bus 41 via a FIFO buffer 56, and a plotter 61 is coupled to the system bus 41 via a FIFO buffer 62.

An interface (I/F) 72 is connected to the system bus 41 and provides a means for coupling a user command input device 71 (such as a joystick controller, a keyboard or any user-operable command input device) to the system bus 41. Also, a boot ROM 73 is coupled to the system bus 41 and serves to provide a program to enable operation of the game playing apparatus upon start up.

A CD-ROM driver 53 is connected to the CD-ROM decoder 52 and is operative to load a CD-ROM disk 90 and reproduce still and moving picture data (which has been compressed, for example, by DCT), as well as texture image data to be mapped to polygonal image surfaces. An application program also recorded on the CD-ROM disk 90 includes polygon plotting instructions. The data reproduced by the CD-ROM driver 53 is decoded by the CD-ROM decoder 52 which provides the decoded data to a FIFO buffer 56 having the capacity to store decoded data reproduced from one sector of the CD-ROM disk 90.

The CPU 42 exercises supervisory control of the game playing apparatus overall, and performs other tasks including certain steps in the plotting of a 3D object as an aggregate of multiple polygonal image surfaces. More specifically, as is described in greater detail below, the CPU 42 produces plotting commands for generating a picture on a display screen and stores the plotting commands in the main memory 43.

The CPU 42 is provided with a cache memory 46 so that the CPU can carry out a set of instructions without fetching each from the system bus 41. The CPU 42 is further provided with a coordinate calculator 44 as an internal coprocessor for executing a coordinate transformation function for transforming the coordinates included within polygon plotting commands corresponding to movement of 3D objects within an image such as, for example, coordinate changes due to rotation of such an object. A coordinate calculator 44 also carries out transformation of the plotting commands from 3D polygon image surface generation commands to two-dimensional polygon plotting commands by projecting the transformed 3D commands onto the plane of the image.

Since the CPU 42 is provided with the instructions cache memory 46 and the coordinate calculator 44, it is capable of carrying out a portion of its processing tasks without use of the system bus 41, so that the system bus 41 may be released from time to time for other tasks.

Figure 3:
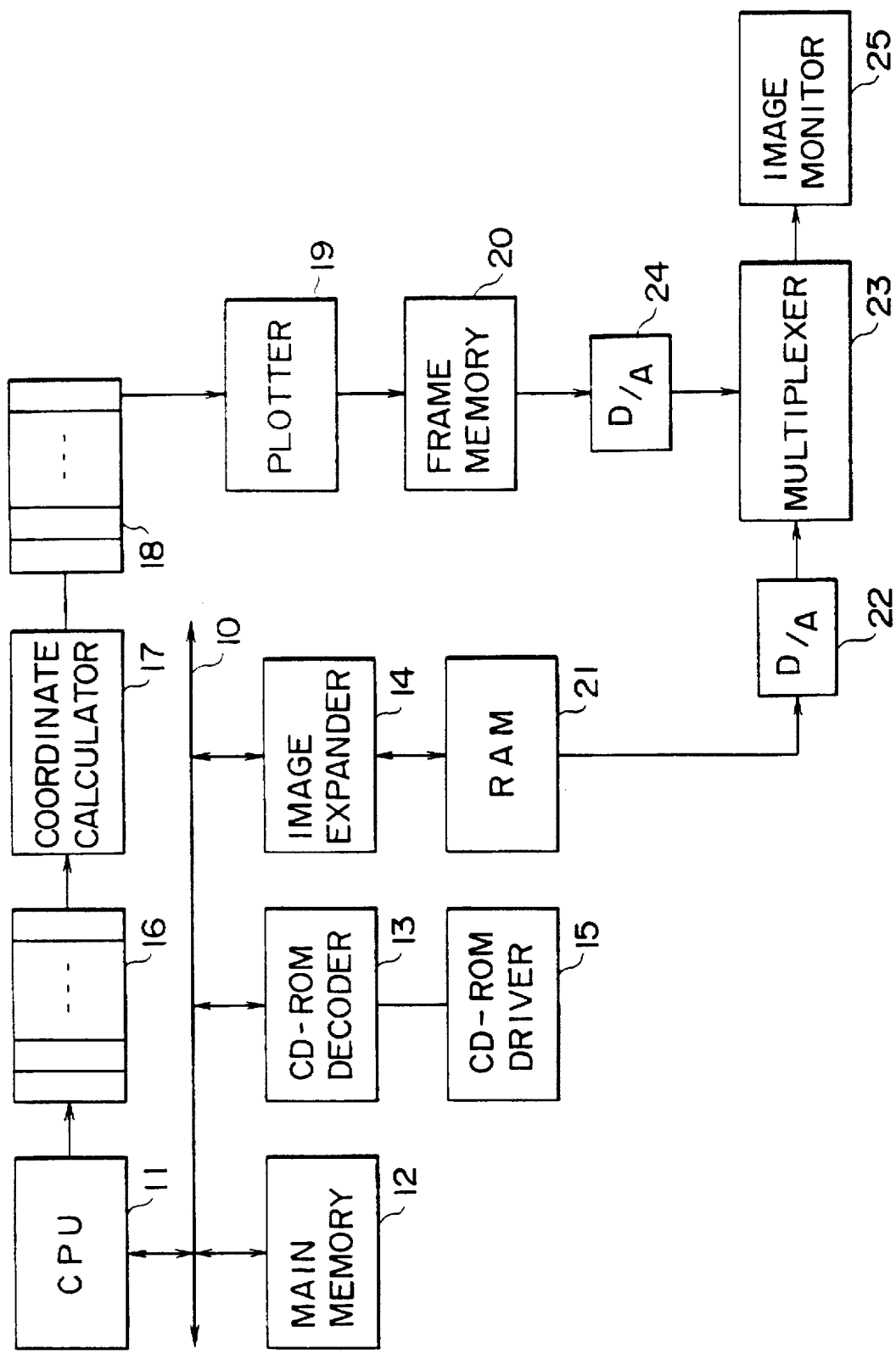
FIG. 3 provides a block diagram of a composite system combining a conventional 3D graphic system and a moving picture reproduction system.
Figure 4:
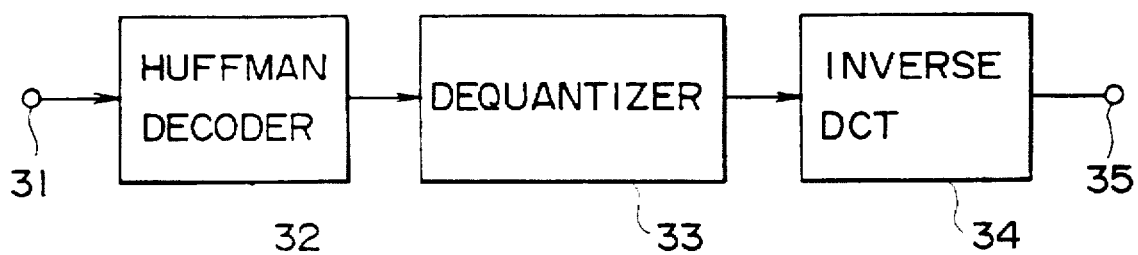
FIG. 4 is a block diagram of a conventional image data expander of the prior art.

The image expander 51 serves to expand the compressed data reproduced from the CD-ROM disk 90. In the embodiment of FIG. 5, the image expander 51 includes hardware corresponding to the dequantizer 33 and the inverse discrete cosine transformer 34 of FIG. 4, while the function of the Huffman decoder 32 of FIG. 4 is carried out in software by the CPU 42. Consequently, the image expander 51 of the FIG. 5 embodiment is relatively less complex than the conventional image expander 14 of FIGS. 3 and 4.

The image expander 51 carries out decoding of the data in macroblock units each composed of 16×16 pixels of an image. The expanded data is transferred macroblock by macroblock between the image expander 51 and the main memory 43. Accordingly, each of the FIFO buffers 54 and 55 requires a capacity of only one macroblock.

A frame memory 63 is coupled to the plotter 61 via a local bus. The plotter 61 executes each plotting command transferred thereto from the main memory 43 via the FIFO buffer 62 and writes the data generated in response to the command in the frame memory 63. The FIFO buffer 62, therefore, is provided with a memory capacity of one plotting command.

The frame memory 63 is provided with an image memory area for storing a plotted image, as well as a texture memory area for storing texture image data and a table memory area for storing a color look-up table (CLUT). With reference also to FIG. 6, the memory space of the frame memory 63 is illustrated therein in schematic form. As will be seen from FIG. 6, the memory space is arranged two-dimensionally by column and row addresses. In the memory space, an area AT serves as the texture memory area and a plurality of texture patterns may be stored therein. AC denotes the table memory area for storing the color look-up table CLUT.

The data stored in the color look-up table is provided from the CD-ROM and is transferred to the frame memory 63 by the sorting controller 45 from the CD-ROM decoder 52. Likewise, the texture image data is supplied from the CD-ROM but is first expanded by the image expander 51 and later transferred to the frame memory 63 from the main memory 43.

The memory area AD in FIG. 6 serves as an image memory area which includes two frame buffer areas, one of which at any given time serves as an image plotting area and the other of which then serves as an image data output buffer. The frame buffer area being used at a given time for outputting image data for display is termed a "display buffer", while the frame buffer area being used at a given time for plotting the image data is termed a "plotting buffer". At any given time, one of the frame buffers is used as a plotting buffer while the other is used concurrently as a display buffer. Upon completion of the plotting process, the roles of the two buffers are switched. The switching operation is synchronized with a vertical synchronization period of the image data. The image data read from the display buffer in the frame memory 63 is output via a D/A converter 64 to an image display monitor 65 to produce a screen image.

The sorting controller 45 functions in a manner similar to that of a DMA controller, and serves to transfer the image data between the main memory 43 and the image expander 51, as well as to transfer a string of plotting commands from the main memory 43 to the plotter 61. The sorting controller 45 executes the above-described transfers during a time when the system bus 41 is released from the CPU 42 as well as other components such as the user command input 71, and carries out the transfers of the image data and the plotting command strings without passing either the data or the commands through the CPU 42. In certain embodiments, the CPU 42 informs the sorting controller 45 that the system bus 41 has been released by the CPU. In other embodiments, the sorting controller 45 forcibly releases the bus 41 from the CPU 42.

The main memory 43 includes a memory area for storing compressed image data (either moving picture or still picture data), as well as a memory area for expanded image data from the image expander 51. The main memory 43 also includes a memory area (referred to hereinafter as a "packet buffer") for storing graphics data such as a string of plotting commands. The packet buffer is shared by the CPU 42 and the plotter 61, such that the packet buffer is used by the CPU 42 to produce the plotting commands and is used as well to transfer the plotting commands to the plotter 61. In the present embodiment, the CPU 42 and plotter 61 operate in parallel with one another. Consequently in this embodiment two packet buffers are provided, that is, a plotting-command generation packet buffer (referred to hereinafter as a "setting packet buffer") and a plotting-command transfer packet buffer (referred to hereinafter as a "execute packet buffer"). At any given time when one of the buffers is used as a setting packet buffer, the other is concurrently used as an execute packet buffer. Upon completion of the transfer of commands from the execute packet buffer, the functions of the two packet buffers are switched.

In operation, when the game playing apparatus of FIG. 5 is switched on and a CD-ROM disk 90 is inserted in the driver 53, the program stored in the boot ROM 73 for initializing the apparatus for executing a game is carried out by the CPU 42, and then the data recorded on the CD-ROM disk 90 is read therefrom. In this stage of the operation, the data which are to be used are decoded in accordance with identification information included in the data in each of the sectors of the CD-ROM disk 90 and the decoded data are checked for errors and the like. Then, depending on the result of the checking process, the CPU 42 causes the compressed image data, the plotting commands and the program to be executed thereby from the CD-ROM disk 90 to be loaded in the main memory 43 by the sorting controller 45. Thereafter, the information of the color look-up table included in the loaded data is transferred to the memory area CLUT of the frame memory 63.

The CPU 42 carries out Huffman decoding of the compressed image data read from the main memory 43 and returns the decoded data to the main memory 43 for storage. Subsequently, the sorting controller 45 transfers the Huffman decoded data from the main memory 43 to the image expander 51 by way of the FIFO buffer 54. The image expander 51 then executes dequantization and inverse discrete cosine transformation to restore the image data to expanded form. The expanded image data is transferred by the sorting controller 45 to the main memory 43 via the FIFO buffer 55. As noted above, the image expander 51 processes the image data on a macroblock by macroblock basis. Accordingly, compressed data is transferred from the main memory 43 in macroblock units to the input FIFO buffer 54 by the sorting controller 45. Once the compressed data has been expanded, the image expander supplies the expanded image data to the output FIFO buffer 55, while reading compressed data of the next macroblock from the input FIFO buffer 54 to expand the same.

If the system bus is released and the output FIFO buffer 55 of the image expander 51 is not empty, the sorting controller 45 transfers the contents of the FIFO buffer 55 (that is, the expanded data of one macroblock) to the main memory 43, and also transfers the compressed image data of the next macroblock from the main memory 43 to the input FIFO buffer 54 of the image expander 51.

When a predetermined amount of the expanded image data has been stored in the main memory 43, the CPU 42 transfers the expanded data to the frame memory 63 via the plotter 61. In this stage of the operation, if the expanded image data is transferred to the image memory area AD of the frame memory 63, the data is displayed directly as a background moving picture by the image monitor 65. In other cases, the expanded image data is transferred to the texture memory area AT of the frame memory 63 for use as texture image data to be mapped to polygonal image surfaces.

The polygonal image surfaces which together represent the surface of a 3D object are plotted sequentially in accordance with Z data (that is, data indicating the distance or depth of each polygonal surface from the plane of the image) such that the polygonal image surface having the greatest depth is first plotted and the remainder are plotted in sequence from the deepest to that polygonal surface which is closest to the plane of the screen. In this fashion, a 3D image can be displayed with the use of a two-dimensional display screen. The CPU 42 produces a string of plotting commands in the main memory 43 which enable the plotter 61 to plot the polygonal image surfaces in sequence starting with that having the greatest depth from the plane of the image.

Computer graphic techniques employ a Z buffer method which first stores Z data for each pixel in a memory and uses this data to determine a display order for polygonal image surfaces. This technique, however, requires a memory having a very large capacity for storing the Z data. The present embodiment employs a simplified and advantageous technique for ordering the plotting commands which avoids the need to provide such a Z buffer.

That is, in the present embodiment as shown in FIGS. 7A and 7B, a tag TG is annexed to each polygon plotting command IP which includes polygon plotting data PD. Each tag of a given command represents an address in the main memory 43 where the next plotting instruction is stored. In addition, the polygon plotting data PD includes identification data IDP indicating the content of the plotting command, as well as data providing vertex coordinates of the polygon to be plotted. The identification data IDP provides an indication of the nature of the polygon (for example, a square) and whether the polygon is to be mapped in a single color. FIG. 7B provides an example of a square-polygon plotting command which has been transformed by the coordinate calculator 44 for plotting a square polygon in the frame memory 63. As seen from FIG. 7B, the plotting command includes the coordinates of the four vertices (X0, Y0), (X1, Y1), (X2, Y2) and (X3, Y3), as well as the data of the three primary colors red, green and blue (R, G, B) for mapping the polygonal image surface in a single color.

In response to commands input by a user via the user command input device 71, the CPU 42 determines the motions of objects within the image as well as any change in the point of view of the image, and produces a string of polygon plotting commands for plotting the consequently modified image. Subsequently, the CPU 42 rewrites the tags of the polygon plotting commands in conformance with the depth of the polygonal surface areas to be plotted from the plane of the image. That is, the plotting command addresses in the main memory 43 are not changed, but only their tags are rewritten.

Once the CPU 42 has completed producing the string of plotting commands, the sorting controller 45 transfers the commands one by one from the main memory 43 to the plotter 61 in accordance with the order determined by the tags TG of the commands. Consequently, the FIFO buffer 62 need have a capacity of only one plotting command. With reference to FIG. 8, this operation is exemplified by the successive execution of commands IP1 through IPn in order according to their respective tags TG1, TG2, TG3, . . . , TGn each of which points to the address and memory of the next command to be transferred to the plotter 61 and executed thereby. As each command is carried out by the plotter 61, the resulting image data is stored in the plotting area AD of the frame memory 63.

Figure 9:
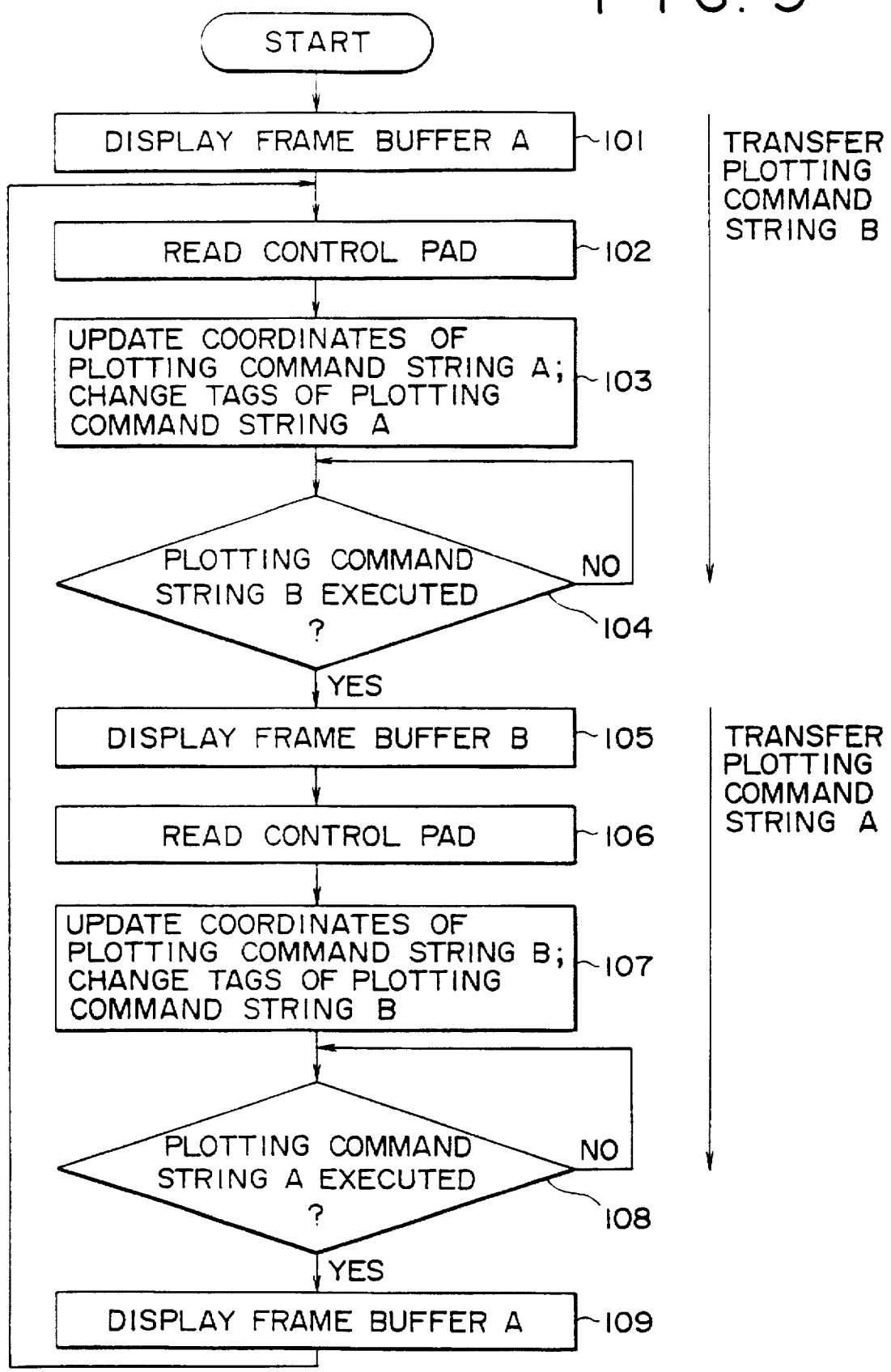
FIG. 9 is a flow chart for use in explaining a processing sequence for plotting and displaying image data as carried out by the embodiment of FIG. 5.

A polygonal image surface plotting procedure (or polygon plotting procedure) carried out by the CPU 42 is described below with reference to the flow chart of FIG. 9. In a step 101, the CPU sends a command to the plotter 61 that a designated one of the frame buffer areas A shall serve as a display buffer so that the contents of its image memory area AD is output to the image monitor 65. In step 102, a user input command from the device 71 is read, and the CPU 42 responds by updating coordinate values of a plotting command string A in a first one of the packet buffers (serving as a setting packet buffer) of the main memory 43. Simultaneously, the individual command tags of the plotting command string A are rewritten.

While steps 101 through 103 are being carried out, a plotting command string B in a second one of the packet buffers (serving as an execute packet buffer) in the main memory 43 is transferred via the plotter 61 to the other frame buffer area B (serving as a plotting buffer) of the image memory area AD of the frame memory 63 by the sorting controller 45. Plotting is executed by the plotter 61 in a real-time mode in response to the plotting command string B.

As indicated by step 104, the CPU 42 then waits until completion of the execution of the plotting command string B. That is, a decision is made periodically whether the plotting execution has been completed after transfer of the plotting command string B from the main memory 43.

When it is determined in the step 104 that the plotting instruction string B has been fully executed, the role of the frame buffer area B of the frame memory 63 is switched so that it serves as a display buffer, and a command is sent to the plotter 61 so that the plotted image data in the display buffer is read therefrom and output to the image monitor 65, as indicated by step 105. Simultaneously, the role of the frame buffer area A of the frame memory 63 is switched so that it serves instead as a plotting buffer.

In a step 106, the CPU 42 again reads any commands input with the use of the device 71, and the CPU 42 in a step 107 proceeds to update the coordinate values in the plotting command string B in the packet buffer now serving as the setting packet buffer in the main memory 43 in response to the input commands. Simultaneously, in the step 107, the individual command tags of the plotting command string B are rewritten accordingly.

During the time that steps 105 through 107 are carried out, the plotting command string A in the packet buffer now serving as an execute packet buffer is transferred via the plotter 61 to the frame buffer area A (now serving as a plotting buffer) by the sorting controller 45. Plotting is then carried out by the plotter 61 in a real-time mode in response to the plotting command string A. After step 107, the CPU 42 waits until the plotting command string A has been fully executed. That is, in a step 108 a decision is made periodically whether the command string A has been fully executed following the transfer of the plotting command string A from the main memory 43.

If in step 108 it is determined that the plotting command string A has been completed, the role of the frame buffer area A is switched so that it then serves as a display buffer, and a command is provided to the plotter 61 to cause the plotted image data to be read from the display buffer and output to the image monitor 65 in a step 109. Simultaneously, the role of the frame buffer B is switched so that it then serves as a plotting buffer. Thereafter the processing sequence returns to the step 102, and the procedure described above is repeated. In this manner, moving images can be displayed by the image data produced with the use of the apparatus of FIG. 5 by carrying out the operations described above repeatedly, typically at a rate of 30–60 times per second.

It will be appreciated from the foregoing that the CPU 42 and the plotter 61 operate in parallel. More specifically, with reference to FIG. 10A, the sorting controller 45 reads out the plotting command string from the plotting packet buffer of the main memory 43 by following the tags thereof as indicated by the arrows in FIG. 10A and transfers the plotting commands in this order to the plotter 61. The plotter 61 executes its plotting operation in response to the transferred command string. Simultaneously, the CPU 42 successively rewrites address values in the command tags of the plotting command string stored in the setting packet buffer of the main memory 43 to new address values to reflect movement within the image or a change in the viewpoint.

Figure 11:
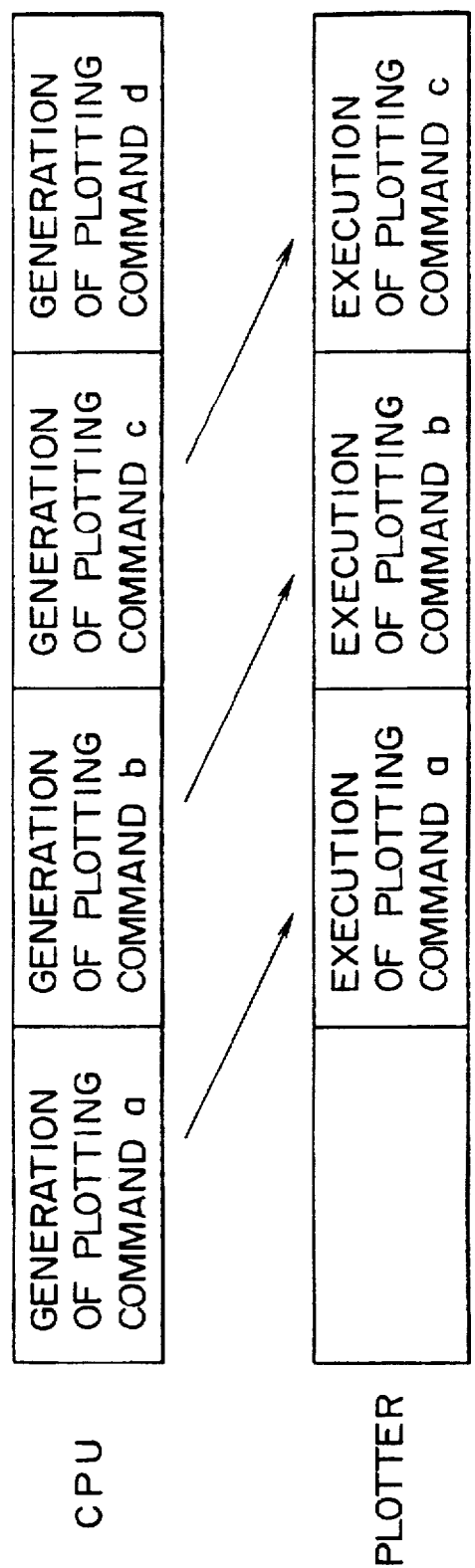
FIG. 11 illustrates the timing of the processes illustrated by Figs. 10A and 10B.

With reference also to FIG. 11, as the CPU 42 produces a current plotting command string, the plotter 61 executes a plotting operation in response to a command string previously generated by the CPU 42. Once the plotter 61 has completed execution of a first string, it executes a subsequent plotting operation in response to a command string previously produced by the CPU 42.

In the polygon plotting process, the plotted data is supplied to a gradient calculation unit in the plotter 61 (not shown for purposes of simplicity and clarity) to carry out a determination of a gradient of the polygonal image surface generated in response to each instruction. The gradient value thus determined is used in mapping data to the polygonal image surface pursuant to the polygon plotting process. The polygonal image surface may be filled either with texture image data or with luminance values to depict shades of light.

Figure 12C:
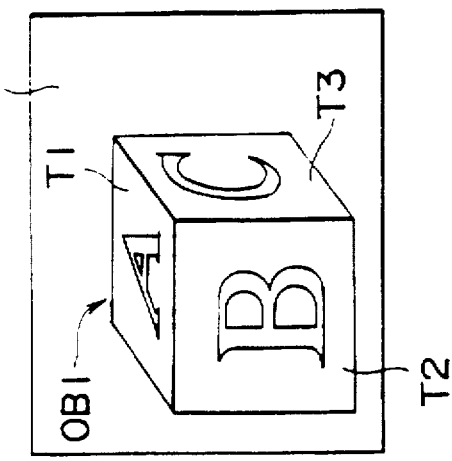
FIGS. 12A through 12C illustrate a texture mapping process.
Figure 12B:
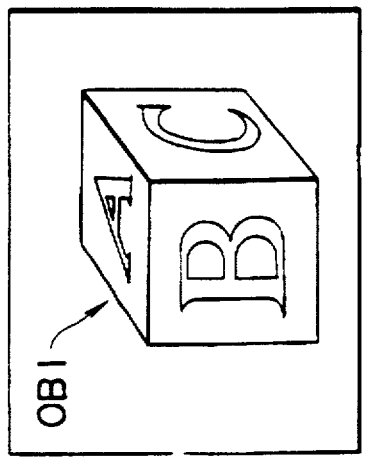
Figure 12A:
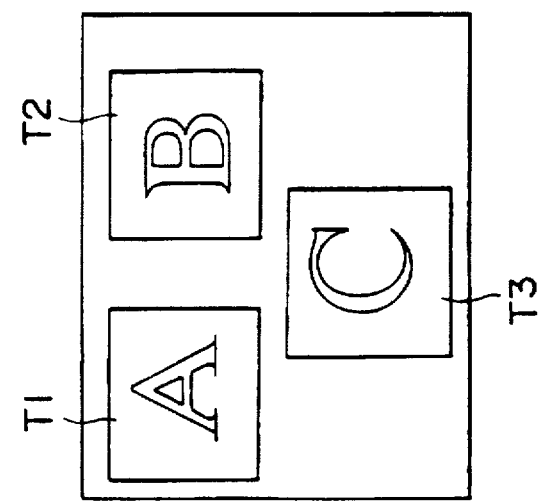

To affix texture image data to polygonal image surfaces depicting the surfaces of an object, texture image data in the texture area AT are transformed into two-dimensional mapping data. As an example, and with reference to FIGS. 12A through 12C, the texture patterns T1, T2 and T3 as illustrated in FIG. 12A are each transformed to conform with respective polygonal image surfaces of an object as illustrated in FIG. 12B. The texture patterns T1, T2 and T3 after such transformation are affixed to the planes of the object OB1 as illustrated in FIG. 12C and the resulting image is stored in the image memory area and later displayed on the screen of the image display monitor 65.

In the case of still picture texture data, texture patterns in the main memory 43 are transferred via the plotter 61 to the texture area AT of the frame memory 63 for storage therein. The plotter 61 then affixes the texture patterns selectively to polygonal image surfaces to thereby produce still picture texture data on an object within an image. The still picture texture data patterns can be recorded in advance on the CD-ROM disc 90.

It is also possible to map moving picture texture data to object surfaces. In this case, compressed moving picture data is read from the CD-ROM disc 90 into the main memory 43 as described hereinabove. Then, as described above, the image data are expanded by carrying out respective processes by means of the CPU 42 and the image expander 51.

The moving picture data as thus expanded is provided to the texture area AT of the frame memory 63, so that the texture pattern itself can be rewritten each frame. Consequently, the moving picture texture image may be produced by texture-mapping each polygonal image surface with moving picture data from the texture area AT.

If expanded image data from the image expander 51 is provided to the image memory area AD of the frame memory 63, a background moving picture can be displayed on the screen of the image display monitor 65. By filing the image memory area AD with only a plotted image produced by the CPU 42, the same can be plotted on the screen of the image display monitor 65. It is also possible to plot an object, by means of commands from the CPU 42, on a still picture formed in the image memory area AD through expansion of image data obtained from the CD-ROM disc 90.

As noted above, the sorting controller 45 transfers plotting commands and image data without passing the same through the CPU 42 during time periods when the system bus 41 is released. An example of how this process may be carried out is illustrated in connection with FIGS. 13A through 13F.

With reference first to FIG. 13A, a horizontally extending time bar 89 illustrates utilization of the system bus 41 by the CPU 42 over time with time progressing from left to right in FIG. 13A. For those times when the system bus 41 is used by the CPU 42 to perform an operation, the bar 89 has been shaded, while during each of the blank portions 81 through 88, the system bus 41 has been released from the CPU 42. FIGS. 13B and 13D provide parallel time bars for illustrating the states of the FIFO buffers 54 and 55 of the image expander 51, wherein shading symbolizes the amount of data stored in each buffer. For example, during the time period 81, the FIFO buffer 54 is gradually filled, while during the time period 83 the FIFO buffer 55 is gradually emptied of its data. FIG. 9C provides a further time bar for illustrating the timing of the data expansion process carried out by the image expander 51.

FIG. 15E is a time bar illustrating the state of the FIFO buffer 62 and the plotter 61 in which, as in the case of FIGS. 13B and 13D, shading indicates the amount of data stored in the FIFO buffer 62. Finally, FIG. 13F is a time bar illustrating successive plotting operations carried out by the plotter 61.

When each of the FIFO buffers 54 and 62 becomes empty, it sends a transfer request to the system bus 41. When the FIFO buffer 55 becomes full, it likewise provides a transfer request to the system bus 41. During those time periods 81 through 88 when the system bus 41 is released from the CPU 42, the sorting controller 45 executes transfers of data from or to each FIFO buffer which has provided a transfer request.

When a plurality of transfer requests are sent simultaneously, a determination is made, in accordance with a predetermined priority order, which of the transfer requests shall be executed. If simultaneous transfer requests are made by buffers having the same priority order, the order of execution is determined by a round robin method in such a manner than the buffer whose transfer request was given the highest priority in the preceding instance is given the lowest priority during a current transfer operation. In the example of FIGS. 13A through 13F, the transfer request from the FIFO buffer 54 or FIFO buffer 55 is accorded a higher priority than that from the FIFO buffer 62.

In the example of FIGS. 13A through 13F, when a transfer request is sent from the empty FIFO buffer 54 during any of the periods 81, 85 and 87, the sorting controller 45 transfers the compressed image data from the main memory 43 to the FIFO buffer 54, as illustrated in FIG. 13B. When the FIFO buffer 54 has been filled, as illustrated in FIG. 9C, the image expander 51 inputs compressed data from the FIFO buffer 54 once it has completed the expansion of compressed data previously received and then commences decoding of the current data for expansion. The FIFO buffer 54 then sends a further transfer request to the bus 41.

Meanwhile, the image expander 51 outputs the expanded data to the FIFO buffer 55 upon completion of the expansion process. The FIFO buffer 55 consequently sends a transfer request to the bus 41 when it has become filled with the expanded data. In the example of FIGS. 13A through 13F, the sorting controller 45 executes data transfers in response to such requests during periods 83 and 86 to transfer the expanded data to the main memory 43.

In this example, a transfer request from the FIFO buffer 62 of the plotter 61 is executed in any of time periods 82, 84 and 88 as illustrated in FIG. 13E and a plotting command is transferred by the sorting controller 45 to the plotter 61. The plotting command thus transferred is executed by the plotter 61 after it completes execution of a preceding plotting command, as illustrated in FIG. 13F.

Figure 14:
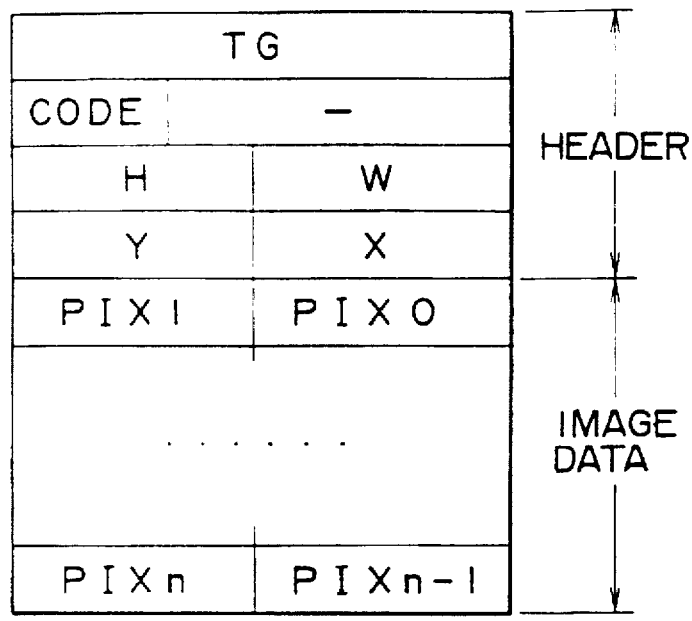
FIG. 14 provides a schematic illustration of an exemplary image data transfer command employed in the embodiment of FIG. 5.

Expanded image data is transferred from the main memory 43 to the frame memory 63 with the use of a transfer command as described below. The CPU 42 converts the expanded image data into a transfer command format as illustrated in FIG. 14. The transfer command format is similar to that of a plotting command, including a tag TG in a beginning portion of the command and identification information IDP immediately following. As in the case of the plotting commands, the tag TG represents an address value in the main memory 43 where the next plotting command or transfer command is stored. The identification information IDP includes a code identifying the command as a transfer command.

As also shown in FIG. 14, the data "H" and "W" denote height and width, respectively of an area of the expanded image data to be transferred. The height and width values of the transfer area correspond to height and width values of a frame area. Data "X" and "Y" of the transfer command denote the coordinates of a frame position to which the image data is to be transferred. The transfer area in this example is rectangular and these coordinates indicate an upper left position of such rectangular area. If the position to which the data are to be transferred is within the image memory area AD of the frame memory 63, the coordinates fall within the area AD. But if the position for transfer is within the texture area AT, the coordinates fall within that area.

The tag TG identification data IDP, height, width and coordinate data constitute a header of the transfer command. The transfer command further includes expanded image data PIX0, PIX1, PIX2, . . . , PIXn. The sorting controller 45 responds to the transfer command by transferring the expanded image data from the main memory 43 to the plotter 61 in accordance with the command.

Figure 15:
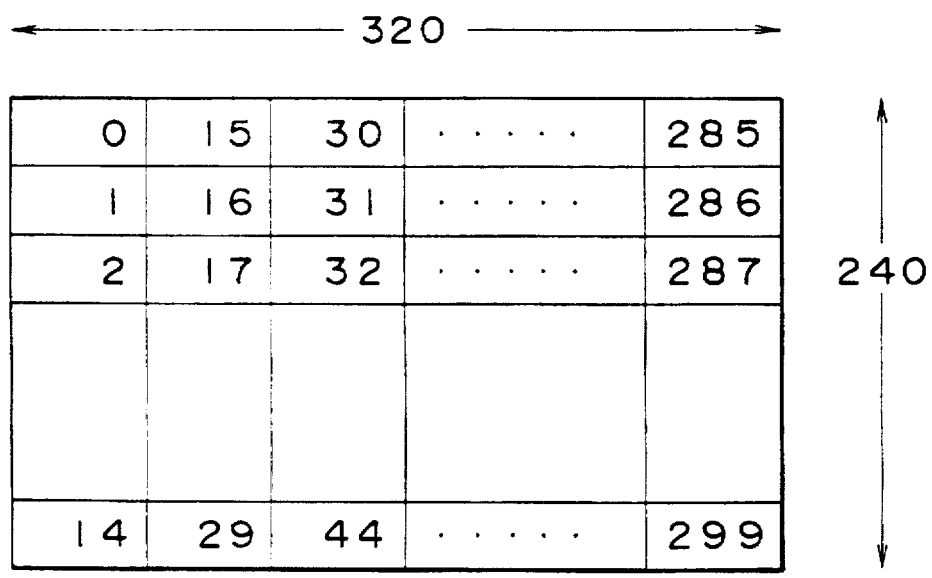
FIG. 15 schematically illustrates the composition of an exemplary image frame.
Figures 16, 17:
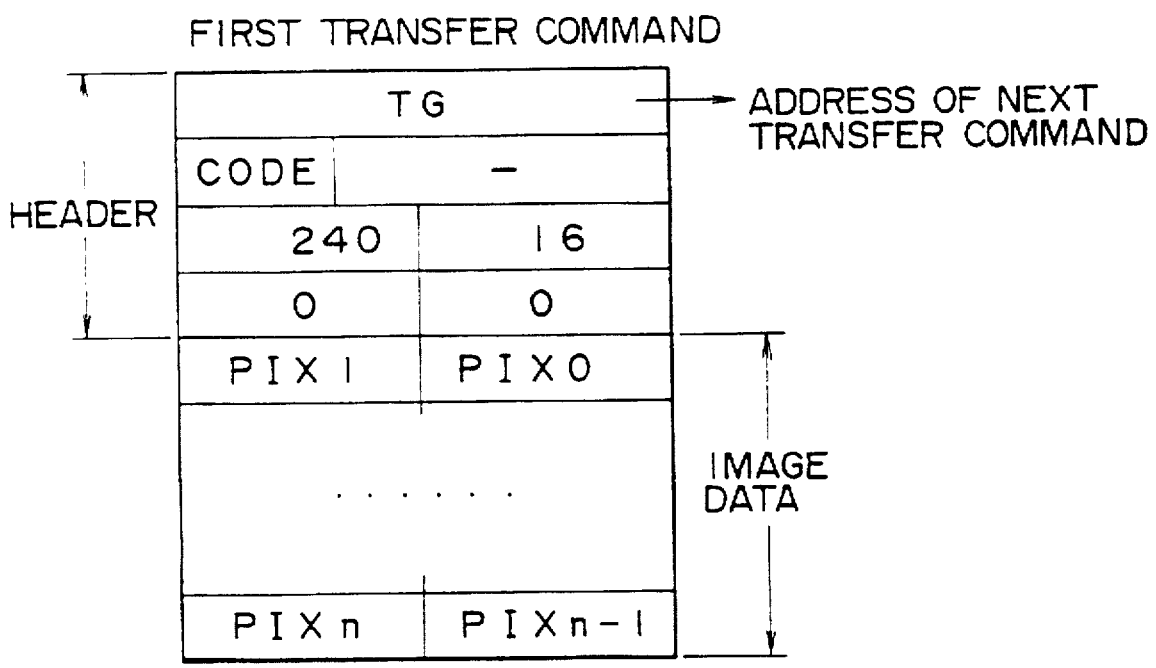
FIG. 16 is a schematic diagram for illustration a technique for dividing a frame of image data for carrying out image transfers in the embodiment of FIG. 5.
FIG. 17 illustrates an exemplary data transfer command employed in the embodiment of FIG. 5.

As mentioned above, the image expander 51 divides the image of each frame into macroblocks arranged as 16×16 pixels and expands the image data in units of macroblocks. If, for example, an exemplary image frame includes 320 pixels in the horizontal direction by 240 pixels in the vertical direction, as illustrated in FIG. 15, the frame is divided into 300 macroblocks. To carry out a transfer of 300 macroblock units creates excessive overhead due to the need to include header information with each transfer instruction. Accordingly, as illustrated in FIG. 16, a plurality of macroblocks in each vertical column are grouped as a unit to be sent by each transfer command. With reference to FIG. 17, an exemplary first transfer command for such a frame is illustrated therein wherein the coordinates X and Y are each given zero values. Accordingly, in the next transfer command of the coordinates X and Y would be given the values 16 and 0, respectively.

In this manner, the expanded image data is converted into a transfer command format which is essentially the same as the plotting format, so that it becomes possible by utilizing a tag TG to transfer both polygon plotting commands and transfer commands freely by means of the sorting controller 45, as well as to execute plotting and image generation in the frame memory 63 by means of the plotter 61.

From the foregoing, it will be seen that the system bus 41 is used efficiently through time division since the plotting command strings, compressed image data and expanded image data from the main memory 3 can be transferred without passing the same through the CPU 42 during those time periods when the system bus 41 is released from the CPU 42. In addition, since entire plotting command strings are held in the memory 43, the CPU 42 is readily capable of exercising direct control over such commands, so that image modification in response to an external input can be realized essentially on an instantaneous basis. It becomes possible, therefore, to enhance the response speed of the apparatus to input commands.

Similarly, since all of the moving picture data are stored in the main memory 43, the CPU 42 is capable at all times of exercising direct control of the moving picture data. Consequently, substantially instantaneous control by the CPU 42 in response to an external input is made possible, thereby further enhancing the response speed of the apparatus.

Moreover, the FIFO buffer required by the plotter 61 need only store one plotting command, thereby reducing the size of the plotter 61.

Since the image expander 51 employs the main memory as a buffer, an additional local memory is not required. Since the FIFO buffers employed by the image expander 51 need only store one macroblock each, the size of the image expander 51 is advantageously reduced.

In the disclosed embodiment, each plotting command includes the address value of the next plotting command in the main memory. Accordingly, if it is necessary to change the order in which the plotting commands are carried out, it is only required to change the address values of the plotting commands, so that it is unnecessary to rewrite or rearrange the plotting commands themselves in the main memory. As a consequence, the load on the system bus can be reduced correspondingly.

In the generation of moving picture images, it is rare that great variations in the contents of the plotting command strings occur between time adjacent frames. Consequently, address values need not be changed frequently, and it is often sufficient merely to change coordinate values in a plotting command string for the preceding frame, so that processing is facilitated.

In the disclosed embodiment, image data and applications programs are read from a CD-ROM. It is to be noted, however, that other forms of recording media, such as magnetic discs and semiconductor memories (such as memory cards) may be used, as well as other sources of image data and application programs. In addition, although discrete cosine transformation is adopted for compression of image data in the above embodiment there are various other suitable alternatives to effect image data compression.

Although specific embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An image processing apparatus for producing a polygonal image representation of an object from three-dimensional image data, comprising:

command generation means for generating one or more plotting commands based upon said three-dimensional data, each said plotting command corresponding to a polygonal surface of said object and including a tag indicative of the depth of said polygonal surface within an image being produced;

storage means for storing said plotting commands;

synthesizing means for receiving said plotting commands and producing said polygonal image representation of said object from said plotting commands; and transfer means for transferring said plotting commands from said storage means to said synthesizing means, said plotting commands being transferred one by one and in an order corresponding to the depth of said polygonal surfaces within said image being produced.

2. The apparatus according to claim 1, further comprising display means for displaying said polygonal image representation of said object.

3. The apparatus according to claim 1, wherein said image being produced is a moving image and said tags are updated in response to movement of said object.

4. The apparatus according to claim 1, wherein said command generation means is a central processing unit that is coupled to said storage means.

5. The apparatus according to claim 1, wherein said transfer means is a sorting controller that is coupled to said storage means.

6. The apparatus according to claim 1, wherein each said tag includes an indicator of polygon type.

7. An image processing method for producing a polygonal image representation of an object from three-dimensional image data, comprising the steps of:

generating one or more plotting commands based upon said three-dimensional data, each said plotting command corresponding to a polygonal surface of said object and including a tag indicative of the position of said polygonal surface within an image being produced;

storing said plotting commands in a storage means;

synthesizing said polygonal image representation of said object from said plotting commands; and transferring said stored plotting commands for use in synthesizing said polygonal image.

8. The method according to claim 7, further comprising the step of displaying said polygonal image representation of said object.

9. The method according to claim 7, wherein when said image being produced is a moving image, and said method further comprises the step of updating said tags in response to movement of said object.

10. The method according to claim 7, wherein said step of transferring said plotting commands is performed by a sorting controller.

11. The method according to claim 8, wherein each said tag includes an indicator of polygon type.

* * * * *